United States Patent
Nakayama et al.

(10) Patent No.: US 6,784,224 B2
(45) Date of Patent: Aug. 31, 2004

(54) PASTE-LIKE POLYMERIZABLE COMPOSITION

(75) Inventors: Mizuki Nakayama, Tokyo (JP); Tomohiro Kumagai, Tokyo (JP)

(73) Assignee: GC Corporation, Tokyo (JP)

( * ) Notice: Subject to any disclaimer, the term of this patent is extended or adjusted under 35 U.S.C. 154(b) by 0 days.

(21) Appl. No.: 10/263,843

(22) Filed: Oct. 4, 2002

(65) Prior Publication Data

US 2004/0068041 A1 Apr. 8, 2004

(51) Int. Cl.$^7$ .................................................. A61K 6/00
(52) U.S. Cl. ...................... 523/120; 106/35; 523/113; 523/115; 523/116; 523/118; 526/90; 526/135; 526/147; 526/204; 526/217; 526/219.2
(58) Field of Search ................................ 523/113, 115, 523/116, 118, 120; 526/217, 219.2, 90, 135, 147, 204; 106/35

(56) References Cited

U.S. PATENT DOCUMENTS

| | | |
|---|---|---|
| 5,250,641 A | 10/1993 | Kumagai et al. |
| 5,770,638 A | 6/1998 | Ueno et al. |
| 6,001,896 A | 12/1999 | Ueno et al. |
| 6,221,931 B1 | 4/2001 | Sakuma et al. |
| 6,265,508 B1 | 7/2001 | Nakayama |
| 6,506,815 B2 | 1/2003 | Shinozaki et al. |

FOREIGN PATENT DOCUMENTS

| | | |
|---|---|---|
| GB | 2 202 543 | 9/1988 |

*Primary Examiner*—Judy M. Reddick
(74) *Attorney, Agent, or Firm*—Oblon, Spivak, McClelland, Maier & Neustadt, P.C.

(57) ABSTRACT

A paste-like polymerizable composition in which two or three pastes are intimately mixed with each other to polymerize, the pastes do not gel and their polymerization curing times being stable, even when the pastes before the polymerization are preserved for a long time, the paste-like polymerizable composition is constructed of a first paste containing (a) a (meth)acrylate having at least one unsaturated double bond, (b) a filler and (c) a pyrimidinetrione derivative; and a second paste containing (a) a (meth) acrylate having at least one unsaturated double bond, (b) a filler, (d) an organic halide and (e) an organometallic compound, or a third paste containing (a) a (meth)acrylate having at least one unsaturated double bond, (b) a filler and (d) an organic halide and a fourth paste containing (a) a (meth)acrylate having at least one unsaturated double bond, (b) a filler and (e) an organometallic compound.

13 Claims, No Drawings

PASTE-LIKE POLYMERIZABLE COMPOSITION

BACKGROUND OF THE INVENTION

1. Field of the Invention

The present invention relates to a paste-like polymerizable composition in which two or three pastes are intimately mixed with each other to polymerize, the pastes do not gel and their polymerization curing times being stable, even when the pastes before the polymerization are preserved for a long period of time. The paste-like polymerizable composition of the present invention can be used for various industrial adhesives and molding resins, and one of its suitable applications is a dental application, especially for dental adhesives. More specifically, the present invention relates to a paste-like polymerizable composition containing a ternary catalyst comprised of a pyrimidinetrione derivative, an organic halide, and an organometallic compound.

2. Description of the Conventional Art

As means for polymerizing a paste-like composition containing a radical polymerizable monomer at an ambient temperature, there has been old employed means for using a combination of an organic peroxide and an aromatic tertiary amine as a chemical polymerization catalyst. In this means, by not only adjusting the amounts of the organic peroxide and the aromatic tertiary amine to be compounded in the paste-like composition but also using a polymerization inhibitor in combination, the polymerization curing time is regulated, and the storage stability of the paste-like composition before the polymerization is enhanced. However, since the organic peroxide is an unstable substance having a half-life, when a large amount of the organic peroxide is compounded in the paste-like composition in order to accelerate the polymerization curing time, the paste-like composition per se is liable to form a gel before the polymerization in the case of preservation over a long period of time. Conversely, when a large amount of the polymerization inhibitor is compounded in the paste-like composition in order to ensure the storage stability over a long period of time, there is involved a problem that the polymerization curing time becomes extremely long. Accordingly, a measure for preserving the paste-like composition under refrigeration to delay the half-life of the organic peroxide had to be taken In addition, polymerization means using oxidation of a trialkylborane is known. But, since the trialkylborane is very easily oxidized, it is impossible to compound it into a radical polymerizable monomer-containing paste-like composition. Accordingly, the trialkylborane must be preserved in a container separately from the monomer and added to the paste-like composition during the use, resulting in that the preservation is laborious and the operation is complicated.

SUMMARY OF THE INVENTION

The present invention is aimed to overcome the above-described problems of the conventional art and to provide a paste-like polymerizable composition in which two or three pastes are intimately mixed with each other to polymerize, the pastes do not gel and their polymerization curing times being stable, even when the pastes before the polymerization are preserved for a long period of time.

In order to achieve the above-described aim, I, the present inventor made extensive and intensive investigations. As a result, it has been found that, when, as polymerization means of a polymerizable composition comprised of (a) a (meth) acrylate having at least one unsaturated double bond and (b) a filler as major components, a ternary catalyst comprising (c) a pyrimidinetrione derivative, (d) an organic halide, and (e) an organometallic compound is used, the ternary catalyst does not have a half-life, and hence, even in the case of preservation over a long period of time, the polymerization curing time is stable, leading to accomplishment of the present invention.

Specifically, the invention is concerned with a paste-like polymerizable composition comprising a first paste comprising (a) a (meth)acrylate having at least one unsaturated double bond, (b) a filler and (c) a pyrimidinetrione derivative; and a second paste comprising (a) a (meth)acrylate having at least one unsaturated double bond, (b) a filler, (d) an organic halide and (e) an organometallic compound, or a third paste comprising (a) a (meth)acrylate having at least one unsaturated double bond, (b) a filler and (d) an organic halide and a fourth paste comprising (a) a (meth)acrylate having at least one unsaturated double bond, (b) a filler and (e) an organometallic compound. When the filler as the component (b) is one or two or more members selected from anhydrated silica, hydrated silica, hydrated calcium silicate, and hydrated aluminum silicate, even in the case of preservation over a long period of time, the paste-like polymerizable composition before the polymerization does not gel, and hence, such is preferred.

DETAILED DESCRIPTION OF THE INVENTION

In the paste-like polymerizable composition according to the present invention, examples of the (meth)acrylate having at least one unsaturated double bond as the component (a) that is used for the respective pastes include methyl (meth) acrylate, ethyl (meth)acrylate, isopropyl (meth)acrylate, n-butyl (meth)acrylate, isobutyl (meth)acrylate, hydroxypropyl (meth)acrylate, tetrahydrofurfuryl (meth)acrylate, glycidyl (meth)acrylate, 2-hydroxyethyl (meth)acrylate, 2-hydroxypropyl (meth)acrylate, 3-hydroxypropyl (meth) acrylate, 2-methoxyethyl (meth)acrylate, 2-ethoxyethyl (meth)acrylate, 2-methoxyethyl (meth)acrylate, 2-ethylhexyl (meth)acrylate, benzyl (meth)acrylate, 2-hydroxy-1,3-di(meth)acryloxypropane, ethylene glycol di(meth)acrylate, diethylene glycol di(meth)acrylate, triethylene glycol di(meth)acrylate, butylene glycol di(meth) acrylate, neopentyl glycol di (meth)acrylate, 1,3-butanediol di(meth)acrylate, 1,4-butanediol di(meth)acrylate, 1,6-hexanediol di(meth)acrylate, trimethylolpropane tri(meth) acrylate, trimethylolethane tri(meth)acrylate, pentaerythritol tri(meth)acrylate, trimethylolmethane tri(meth)acrylate, pentaerythritol tetra(meth)acrylate, polybutylene glycol di(meth)acrylate, and bisphenol A diglycidyl (meth)acrylate. Further, examples of (meth)acrylates having a urethane bond include di-2-(meth)acryloxyethyl-2,2,4-trimethylhexamethylene dicarbamate and 1,3,5-tris[1,3-bis{(meth)-acryloyloxy)-2-propoxycarbonylaminohexane]-1,3,5-(1H, 3H,5H) triazin-2,4,6-trione. Besides, there are exemplified a (meth)acrylate of a urethane oligomer comprising 2,2'-di(4-hydroxycyclohexyl)propane, 2-oxypanone, hexamethylene diisocyanate and 2-hydroxyethyl (meth)acrylate and a (meth)acrylate of a urethane oligomer comprising 1,3-butanediol, hexamethylene diisocyanate and 2-hydroxyethyl (meth)acrylate. These (meth)acrylates may be used alone or in admixture of two or more thereof. Of these, are particularly preferred tetrahydrofurfuryl (meth)arylate, glycidyl (meth)acrylate, 2-hydroxyethyl (meth)acrylate, 2-hydroxypropyl (meth)acrylate, 3-hydroxypropyl (meth) acrylate, and 2-hydroxy-1,3-di(meth)acrylate, because they well dissolve the pyrimidinetrione derivative and the organic halide therein.

In the paste-like polymerizable composition according to the present invention, examples of the filler as the component (b) that is used for the respective pastes are powders of anhydrated silica, glasses such as barium glass, alumina glass, potassium glass, and fluoroaluminosilicate glass, synthetic zeolite, calcium phosphate, feldspar, fumed silica, aluminum silicate, calcium silicate, magnesium carbonate, hydrated silica, hydrated calcium silicate, hydrated aluminum silicate, and quartz. These fillers may be subjected to a surface treatment with, e.g., γ-methacryloxypropyl trimethoxysilane, vinyl trichlorosilane, vinyl triethoxysilane, vinyl trimethoxysilane, vinyl triacetoxysilane, vinyl tri(methoxyethoxy)silane. Further, are employable organic-inorganic composite fillers prepared by mixing the foregoing filler with a polymerizable monomer or oligomer, curing the mixture and then pulverizing the cured mixture. These fillers may be used alone or in admixture of two or more thereof. Of these, are preferred anhydrated silica, hydrated silica, hydrated calcium silicate, and hydrated aluminum silicate, because, even in the case of preservation over a long period of time, they have an effect for preventing the paste-like polymerizable composition before polymerization from gelling. Incidentally, as a matter of course, with respect to the components (a) and (b) to be used in the present invention, different substances may be used for the respective pastes.

In the paste-like polymerizable composition according to the present invention, examples of the pyrimidinetrione derivative as the component (c) that is used for the first paste comprising (a) a (meth)acrylate having at least one unsaturated double bond, (b) a filler and (c) a pyrimidinetrione derivative include 1-benzyl-5-phenyl-pyrimidinetrione, 1-cyclohexyl-5-ethyl-pyrimidinetrione, 1,3-dimethyl-5-cyclopentyl-pyrimidinetrione, 1,3- dimethyl-5-cyclohexyl-pyrimidinetrione, 1,3- dimethyl-5-ethyl-pyrimidinetrione, 1,3-dimethyl-5- isobutyl-pyrimidinetrione, 1,3-dimethyl-5-phenyl-pyrimidinetrione, 1,3-dimethyl-5-n-butyl-pyrimidinetrione, 1,5-dimethyl-pyrimidinetrione, 5-n-butyl-pyrimidinetrione, 5-cyclohexyl-pyrimidinetrione, 5-ethyl-pyrimidinetrione, 5-isobutyl-pyrimidinetrione, 5-isopropyl-pyrimidinetrione, 5-phenylpyrimidinetrione, and 1,3,5-trimethyl-pyrimidinetrione. These pyrimidinetrione derivatives may be used alone or in admixture of two or more thereof. A suitable amount of the pyrimidinetrione derivative as the component (c) is 0.05 to 5 parts by weight based on 100 parts by weight of the total sum of the (meth)acrylate having at least one unsaturated double bond as the component (a) and the filler as the component (b) in the first paste.

In the paste-like polymerizable composition according to the present invention, examples of the organic halide as the component (d) that is used for other paste(s) than the first paste comprising (a) a (meth)acrylate having at least one unsaturated double bond, (b) a filler and (c) a pyrimidinetrione derivative include benzyltributylammonium chloride, benzyldimethylcetylammonium chloride, benzyldimethylsteaxylammonium chloride, benzyltriethylammonium bromide, benzyltrimethylammonium chloride, cetalkonium chloride, cetylpyridinium bromide, cetylpyridinium chloride, cetyltriethylammonium bromide, didecyldimethylammonium chloride, dilauryldimethylammonium chloride, domiphen bromide, lauryldimethylammonium chloride, tetra-n-butylammonium bromide, tetra-n-butylammonium chloride, tetra-n-butyl ammonium iodide, tetradecyltrimethylammonium bromide, tetraethylammonium bromide, tetraethylammonium iodide, and trioctylmethylammonium chloride. These organic halides may be used alone or in admixture of two or more thereof. A suitable amount of the organic halide as the component (d) is 0.05 to 5 parts by weight based on 100 parts by weight of the total sum of the (meth)acrylate having at least one unsaturated double bond as the component (a) and the filler as the component (b) in the paste other than the first paste.

In the paste-like polymerizable composition according to the present invention, examples of the organometallic compound as the component (e) that is used for other paste(s) than the first paste comprising (a) a (meth)acrylate having at least one unsaturated double bond, (b) a filler and (c) a pyrimidinetrione derivative include acetylacetone copper, copper 4-cyclohexylbutyrate, cupric acetate, copper oleate, acetylacetone manganese, manganese naphthenate, manganese octylate, acetylacetone cobalt, cobalt naphthenate, acetylacetone lithium, lithium acetate, acetylacetone zinc, zinc naphthenate, acetylacetone nickel, nickel acetate, acetylacetone aluminum, acetylacetone calcium, acetylacetone chromium, acetylacetone iron, sodium naphthenate, and rare earth octoate. These organometallic compounds may be used alone or in admixture of two or more thereof. A suitable amount of the organometallic compound as the component (e) is 0.0001 to 0.1 parts by weight based on 100 parts by weight of the total sum of the (meth)acrylate having at least one unsaturated double bond as the component (a) and the filler as the component (b) in the paste other than the first paste.

In the paste-like polymerizable composition according to the present invention, with respect to the organic halide as the component (d) and the organometallic compound as the component (e) to be used for other paste(s) than the first paste comprising (a) a (meth)acrylate having at least one unsaturated double bond, (b) a filler and (c) a pyrimidinetrione derivative, there are the case where they are compounded in one paste as in the second paste comprising (a) a (meth)acrylate having at least one unsaturated double bond, (b) a filler, (d) an organic halide and (e) an organometallic compound; and the case where they are separately compounded in two pastes as in the third paste comprising (a) a (meth)acrylate having at least one unsaturated double bond, (b) a filler and (d) an organic halide and the fourth paste comprising (a) a (meth)acrylate having at least one unsaturated double bond, (b) a filler and (e) an organometallic compound.

This is because, when the organic halide as the component (d) or the organometallic compound as the component (e) is simultaneously compounded in the first paste having the pyrimidinetrione derivative as the component (c) compounded therein, radicals are generated at an ambient temperature in the first paste, whereby the polymerization is initiated.

It is possible to further compound a photopolymerization type polymerization initiator in the paste-like polymerizable composition according to the present invention and irradiate the mixture with light such as ultraviolet light and visible lights, thereby initiating the polymerization. During this operation, as a light source, are employable various mercury vapor lamps of super high pressure, high pressure, medium pressure and low pressure, a chemical lamp, a carbon arc lamp, a metal halide lamp, a fluorescent lamp, a tungsten lamp, a xenon lamp, and an argon ion laser A suitable compounding amount of the photopolymerization type polymerization initiator is 0.01 to 5 parts by weight based on 100 parts by weight of the total sum of the (meth)acrylate having at least one unsaturated double bond as the component (a) and the filler as the component (b).

To the paste-like polymerizable composition according to the present invention, can be added various components other than those as described above, such as organic solvents, polymerization inhibitors, antioxidants, ultraviolet light absorbers, and pigments, it desired in practical use.

The present invention will be described below in more detail with reference to the following Examples, but it should not be construed that the present invention is limited thereto.

Preparation of Paste-Like Composition

According to the formulations as shown in Table 1 below, the respective components of Examples 1 to 3 and Comparative Example 1 were compounded, and predetermined amounts of the components were intimately mixed to prepare paste-like polymerizable compositions comprising two or three pastes. Incidentally, in Example 3, the second paste was additionally compounded with camphor quinone as a sensitizer of the photopolymerization type polymerization initiator and ethyl 4-dimethylaminobenzoate as a reducing agent; and in Comparative Example 1, the first paste was compounded with wet benzoyl peroxide as an organic peroxide, and the second paste was compounded with N,N-dimethyl-p-toluidine as an aromatic tertiary amine, respectively.

TABLE 1

(Formulation of paste-like polymerizable composition)

| | | (a) (Meth)acrylate [% by weight] | | (b) Filler [% by weight] | | (c) Pyrimidlnetrione derivative [parts by weight based on 100 parts by weight of (a) + (b)] | | (d) Organic halide [parts by weight based on 100 parts by weight of (a) + (b)] | | (e) Organometallic compound [parts by weight based on 100 parts by weight of (a) + (b)] | | Others [parts by weight based on 100 parts by weight of (a) + (b)] | |
|---|---|---|---|---|---|---|---|---|---|---|---|---|---|
| Example 1 Mixing ratio = 1:1 | First paste | UDMA<br>2-Hydroxy-1,3-di-methacryl-oxy-propane<br>Triethylene glycol dimethacrylate | 24.4<br>5.3<br><br><br><br>1.6 | 2% silane-treated aluminosilicate glass powder<br>Fine anhydrated silica powder | 66.7<br><br><br><br>2.0 | 1-Cyclohexyl-5-ethyl-pyrimidine-trione | 0.9 | | | | | Butylhyroxy-toluene | 0.04 |
| | | Total | 31.3 | Total | 68.7 | | | | | | | | |
| | Second paste | UDMA<br>2-Hydroxy methacrylate<br>Triethylene glycol dimethacrylate | 29.4<br>3.4<br><br>1.0 | 2% silane-treated aluminosilicate glass powder<br>Fine anhydrated silica powder<br>Fine hydrated silica powder | 64.2<br><br><br>1.0<br><br>1.0 | | | Benzyltriethyl ammonium chloride | 0.16 | Acetylacetone copper | 0.0013 | Butylhyroxy-tolene | 0.04 |
| | | Total | 33.8 | Total | 66.2 | | | | | | | | |
| Example 2 Mixing ratio = 1:1:1 | First paste | UDMA<br>2-Hydroxy-1,3-di-methacry-loxy-propane<br>Tetrahydrofurfuryl methacrylate | 24.4<br>5.3<br><br><br><br>1.6 | 2% silane-treated aluminosilicate glass powder<br>Fine anhydrated silica powder | 66.7<br><br><br><br>2.0 | 5-n-Butyl-pyrimidi-netrione | 0.8 | | | | | Butylhyroxy-toluene | 0.04 |
| | | Total | 31.3 | Total | 68.7 | | | | | | | | |
| | Third paste | UDMA<br>2-Methoxy-ethyl methacrylate<br>Triethylene glycol dimethacrylate | 29.4<br>3.4<br><br>1.0 | 2% silane-treated aluminosilicate glass powder<br>Fine anhydrated silica powder<br>Fine hydrated silica powder | 64.2<br><br><br>1.0<br><br>1.0 | | | Dilauryl-dimethyl-ammonium chloride | 0.25 | | | Butylhyroxy-tolene | 0.04 |
| | | Total | 33.8 | Total | 66.2 | | | | | | | | |

TABLE 1-continued (Formulation of paste-like polymerizable composition)

|  |  | (a) (Meth)acrylate [% by weight] |  | (b) Filler [% by weight] |  | (c) Pyrimidlnetrione derivative [parts by weight based on 100 parts by weight of (a) + (b)] |  |  |  |  |  | Others [parts by weight based on 100 parts by weight of (a) + (b)] |  |
|---|---|---|---|---|---|---|---|---|---|---|---|---|---|
|  | Fourth paste | Bisphenol A diglycidyl methacrylate | 29.4 | 2% silane-treated aluminosilicate glass powder | 64.2 |  |  |  |  | Copper 4-cyclohexyl-butyrate | 0.0013 | Butylhyroxy-tolune | 0.04 |
|  |  | 2-Hydroxy methacrylate | 3.4 |  |  |  |  |  |  |  |  |  |  |
|  |  | Triethylene glycol dimethacrylate | 1.0 | Fine anhydrated silica powder | 2.0 |  |  |  |  |  |  |  |  |
|  |  | Total | 33.8 | Total | 66.2 |  |  |  |  |  |  |  |  |
| Example 3 Mixing ratio = 1:1 | First paste | UDMA | 24.4 | 2% silane-treated aluminosilicate glass powder | 66.7 | 1-Benzyl-5-phenyl-pyrimidine-trione | 1.2 |  |  |  |  | Butylhyroxy-toluene | 0.04 |
|  |  | 2-Hydroxy-1,3-dimethacryloxy-propane | 5.3 |  |  |  |  |  |  |  |  |  |  |
|  |  | Triethylene glycol dimethacrylate | 1.6 | Fine anhydrated silica powder | 2.0 |  |  |  |  |  |  |  |  |
|  |  | Total | 31.3 | Total | 68.7 |  |  |  |  |  |  |  |  |
|  | Second paste | UDMA | 29.4 | 2% silane-treated aluminosilicate glass powder | 64.2 | Camphor quinose | 0.1 | Benzyl-methylcetyl-ammonium chloride | 0.20 | Acetylacetone copper | 0.0013 | Butylhyroxy-tolene | 0.04 |
|  |  | 2-Hydroxy methacrylate | 3.4 |  |  | Ethyl 4-dimethyl-amino-benzoate | 0.5 |  |  |  |  |  |  |
|  |  | Triethylene glycol dimethacrylate | 1.0 | Fine anhydrated silica powder | 1.0 |  | 1.0 |  |  |  |  |  |  |
|  |  |  |  | Fine hydrated silica powder | 1.0 |  |  |  |  |  |  |  |  |
|  |  | Total | 33.8 | Total | 66.2 |  |  |  |  |  |  |  |  |

|  |  | (a) (Meth)acrylate [% by weight] |  | (b) Filler [% by weight] |  | (c) Pyrimidlnetrione derivative [parts by weight based on 100 parts by weight of (a) + (b)] |  | Others [parts by weight based on 100 parts by weight of (a) + (b)] |  |
|---|---|---|---|---|---|---|---|---|---|
| Comparative Example 1 Mixing ratio = 1:1 | First paste | UDMA | 24.4 | 2% silane-treated aluminosilicate glass powder | 66.7 | Wet benzoyl peroxide | 2.0 | Butylhyroxytoluene | 0.04 |
|  |  | 2-Hydroxy-1,3-di-methacryloxy-propane | 5.3 |  |  |  |  |  |  |
|  |  | Triethylene glycol dimethacrylate | 1.6 | Fine anhydrated silica powder | 2.0 |  |  |  |  |
|  |  | Total | 31.3 | Total | 68.7 |  |  |  |  |
|  | Second paste | UDMA | 29.7 | 2% silane-treated aluminosilicate glass powder | 64.2 | N,N-Dimethyl-p-toluidine | 0.3 | Butylhyroxy-tolene | 0.04 |
|  |  | 2-Hydroxy methacrylate | 3.4 |  |  |  |  |  |  |
|  |  | Triethylene glycol dimethacrylate | 1.0 | Fine anhydrated silica powder | 1.0 |  |  |  |  |
|  |  | Total | 34.1 | Total | 65.9 |  |  |  |  |

Measurement of Polymerization Curing Time and Temperature

In a thermostat chamber at a temperature of 23° C. and at a humidity of 50%, the paste-like polymerizable compositions in each of Examples 1 to 3 and Comparative Example 1 were intimately mixed with each other in a predetermined weight ratio as shown in Table 1 for 10 seconds, and the intimate mixture was poured into a columnar mold having an inner diameter of 7 mm and a height of 0.5 mm. The intimate mixture was measured for a polymerization curing time from the start of intimate mixing to a heat generation peak and a temperature at that time by using a thermocouple. Further, each of the first pastes, second pastes and third paste of Examples 1 to 3 and Comparative Example 1 was preserved in a thermostat chamber at a temperature of 45° C. or 60° C. and at a humidity of 50% and then examined whether the pastes gelled or not. Also, the polymerization curing time and temperature at that time of each of the paste-like polymerizable compositions were measured under the same conditions as described above.

The results obtained are summarized and shown in Table 2.

TABLE 2

(Changes in curing lime and heat generation peak temperature by preservation test)

| | | | Preservation for 7 days | | Preservation for 14 days | | Preservation for 21 days | |
|---|---|---|---|---|---|---|---|---|
| | | Initial stage | 45° C. | 60° C. | 45° C. | 60° C. | 45° C. | 60° C. |
| Example 1 | Time | 7' 48" | 7' 52" | 7' 00" | 7' 50" | 8' 27" | 7' 57" | 8' 36" |
| | Temperature | 28° C. | 28° C. | 28° C. | 28° C. | 27° C. | 27° C. | 27° C. |
| Example 2 | Time | 5' 12" | 5' 08" | 5' 35" | 4' 58" | 5' 42" | 5' 18" | 5' 49" |
| | Temperature | 30° C. | 30° C. | 29° C. | 30° C. | 29° C. | 29° C. | 28° C. |
| Example 3 | Time | 2' 36" | 2' 49" | 3' 05" | 2' 39" | 3' 13" | 3' 01" | 3' 12" |
| | Temperature | 34° C. | 33° C. | 33° C. | 34° C. | 33° C. | 33° C. | 32° C. |
| Comparative Example 1 | Time | 13' 00" | 14' 21" | Gelled | 15' 35" | Gelled | 18' 55" | Gelled |
| | Temperature | 38° C. | 31° C. | | 26° C. | | 25° C. | |

As is clear from Table 2, in each of Examples 1 to 3 that is the paste-like polymerizable composition according to the present invention, even when each of the pastes before the polymerization was preserved over a long period of time, the paste did not gel; and when the paste was mixed and polymerized, a delay of the polymerization curing time was small as within 1 minute, and the temperature at that time was approximately constant and stable. On the other hand, in Comparative Example 1, when each of the pastes before the polymerization was preserved over a long period of time, the paste often gelled; and even though it did not gel, when the paste was mixed and polymerized, a delay of the polymerization curing time was about 6 minutes, and the change in the temperature at that time was remarkable.

As described above in detail, in the paste-like polymerizable composition according to the present invention, even when each of the pastes before the polymerization is preserved over a long period of time, the paste does not gel, and the polymerization curing time and the temperature at that time are stable. Accordingly, it can be said that the paste-like polymerizable composition according to the present invention is one having very superior properties.

While the present invention has been described in detail and with reference to specific embodiments thereof, it will be apparent to one skilled in the art that various changes and modifications can be made therein without departing from the spirit and scope thereof.

What is claimed is:

1. A paste-like polymerizable composition comprising (A) and (B), or (A) and (C), wherein:
   (A) is a first paste comprising (a) a (meth)acrylate having at least one unsaturated double bond, (b) a filler and (c) a pyrimidinetrione derivative,
   (B) is a second paste comprising (a) a (meth)acrylate having at least one unsaturated double bond, (b) a filler, (d) an organic halide and (e) an organometallic compound, and
   (C) is a third paste comprising (a) a (meth) acrylate having at least one unsaturated double bond, (b) a filler and (d) an organic halide and a fourth paste comprising (a) a (meth)acrylate having at least one unsaturated double bond, (b) a filler and (e) an organometallic compound, wherein the first paste does not contain components (d) or (e), and wherein neither the second paste, nor the third paste, nor the fourth paste contains component (c).

2. The paste-like polymerizable composition according to claim 1, wherein the filler as the component (b) is selected from the group consisting of anhydrated silica, hydrated silica, hydrated calcium silicate, hydrated aluminum silicate, and mixtures thereof.

3. The paste-like polymerizable composition according to claim 1, wherein the pyrimidinetrione derivative (c) is selected from the group consisting of 1-benzyl-5-phenyl-pyrimidinetrione, 1-cyclohexyl-5-ethyl-pyrimidinetrione, 1,3-dimethyl-5-cyclopentyl-pyrimidinetrione, 1,3-dimethyl-5-cyclohexyl-pyrimidinetrione, 1,3- dimethyl-5-ethyl-pyrimidinetrione, 1,3-dimethyl-5- isobutyl-pyrimidinetrione, 1,3-dimethyl-5- phenyl-pyrimidinetrione, 1,3-dimethyl-5-n-butyl-pyrimidinetrione, 1,5-dimethyl-pyrimidinetrione, 5-n-butyl-pyrimidinetrione, 5-cyclohexyl-pyrimidinetrione, 5-ethyl-pyrimidinetrione, 5-isobutyl-pyrimidinetrione, 5-isopropyl-pyrimidinetrione, 5-phenylpyrimidinetrione, and 1,3,5-trimethyl-pyrimidinetrione.

4. The paste-like polymerizable composition according to claim 1, wherein the organic halide (d) is selected from the group consisting of benzyltributylammonium chloride, benzyldimethylcetylammonium chloride, benzyldimethylsteaxylammonium chloride, benzyltriethylammonium bromide, benzyltrimethylammonium chloride, cetalkonium chloride, cetylpyridinium bromide, cetylpyridinium chloride, cetyltriethylammonium bromide, didecyldimethylammonium chloride, dilauryldimethylammonium chloride, domiphen bromide, lauryldimethylammonium bromide, tetra-n-butylammonium bromide, tetra-n-butylammonium chloride, tetra-n-butylammonium iodide, tetradecyltrimethylammonium bromide, tetraethylammonium bromide, tetraethylammonium iodide, and trioctylmethylammonium chloride.

5. The paste-like polymerizable composition according to claim 1, wherein the organometallic compound (e) is selected from the group consisting of acetylacetone copper, copper 4-cyclohexylbutyrate, cupric acetate, copper oleate, acetylacetone manganese, manganese naphthenate, manganese octylate, acetylacetone cobalt, cobalt naphthenate, acetylacetone lithium, lithium acetate, acetylacetone zinc, zinc naphthenate, acetylacetone nickel, nickel acetate, acetylacetone aluminum, acetylacetone calcium, acetylacetone chromium, acetylacetone iron, sodium naphthenate, and rare earth octoate.

6. The paste-like polymerizable composition according to claim 3, wherein the pyrimidinetrione derivative (c) is present in an amount of 0.05 to 5 parts by weight based on 100 parts by weight of the total of (a) and (b) of the first paste.

7. The paste-like polymerizable composition according to claim 4, wherein the amount of organic halide (d) is 0.05 to 5 parts by weight based on 100 parts by weight of the total of (a) and (b) in the second paste, or of the total of (a) and (b) in the third paste and the fourth paste combined.

8. The paste-like polymerizable composition according to claim 5, wherein the amount of the organometallic compound (e) is 0.0001 to 0.1 parts by weight based on 100 parts by weight of the total of (a) and (b) in the second paste, or of the total of (a) and (b) in the third paste and the fourth paste combined.

9. The paste-like polymerizable composition according to claim 1, wherein the pyrimidinetrione derivative (c) is 1-cyclohexyl-5-ethyl pyrimidinetrione.

10. The paste-like polymerizable composition according to claim 1, wherein the organic halide (d) is benzyltrimethylammonium chloride.

11. The paste-like polymerizable composition according to claim 1, wherein the organometallic compound (e) is acetylacetone copper.

12. The paste-like polymerizable composition according to claim 1, wherein the first paste and the second paste are present.

13. The paste-like polymerizable composition according to claim 1, wherein the first paste, the third paste and the fourth paste are present.

* * * * *